(12) United States Patent
Egles et al.

(10) Patent No.: US 10,897,438 B2
(45) Date of Patent: *Jan. 19, 2021

(54) DIRECT COMMUNICATION BETWEEN A SECURE APPLICATION AND A LOCAL APPLICATION RUNNING ON THE SAME DEVICE

(71) Applicant: International Business Machines Corporation, Armonk, NY (US)

(72) Inventors: Guillaume Egles, Oakland, CA (US); Brian Din, Davis, CA (US); Georges Vieux, Fremont, CA (US); Richard Cochran, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,283

(22) Filed: Jul. 10, 2019

(65) Prior Publication Data
US 2020/0396185 A1 Dec. 17, 2020

Related U.S. Application Data

(63) Continuation of application No. 16/438,616, filed on Jun. 12, 2019.

(51) Int. Cl.
*H04L 29/06* (2006.01)
*H04L 12/58* (2006.01)
(Continued)

(52) U.S. Cl.
CPC .......... *H04L 51/046* (2013.01); *G06F 16/955* (2019.01); *H04L 65/1069* (2013.01); *H04L 65/1083* (2013.01); *H04L 67/02* (2013.01)

(58) Field of Classification Search
CPC ... H04L 65/1069; H04L 67/02; H04L 65/608; H04L 65/403; H04L 61/2575; H04L 61/2589

See application file for complete search history.

(56) References Cited

U.S. PATENT DOCUMENTS 9,621,845 B2 4/2017 Shan et al.
9,756,452 B2 * 9/2017 Mandyam ............... H04W 4/70
(Continued)

FOREIGN PATENT DOCUMENTS

WO 2015077316 A1 5/2015

OTHER PUBLICATIONS

Sajjad Taheri, WebRTCBench: A Benchmark for Performance Assessment of WebRTC Implementations, Dec. 17, 2015 ,UC Irvine, IEEE.*

(Continued)

*Primary Examiner* — Chirag R Patel
(74) *Attorney, Agent, or Firm* — Yee & Associates, P.C.

(57) ABSTRACT

Establishing communication between a secure web application and a local native application is provided. A first input is received to establish a direct Web Real-Time Communication data channel between the secure web application running in a web browser and the local native application running outside the web browser in the data processing system. In response to receiving the first input, the direct Web Real-Time Communication data channel is established between the secure web application running in the web browser and the local native application running outside the web browser in the data processing system.

7 Claims, 7 Drawing Sheets

(51) Int. Cl.
*G06F 16/955* (2019.01)
*H04L 29/08* (2006.01)

(56) References Cited

U.S. PATENT DOCUMENTS

| | | | |
|---|---|---|---|
| 9,781,167 | B2 | 10/2017 | Gaviria |
| 10,212,192 | B2 | 2/2019 | Wallis |
| 2011/0138059 | A1 | 6/2011 | Schleifer et al. |
| 2014/0222894 | A1 | 8/2014 | Gangdharan et al. |
| 2015/0304359 | A1 | 10/2015 | Balasaygun et al. |
| 2016/0112473 | A1* | 4/2016 | Labranche .............. H04L 51/04 709/204 |
| 2017/0142111 | A1* | 5/2017 | Ezell ..................... H04L 67/02 |
| 2017/0354878 | A1* | 12/2017 | Posin .................... A63F 13/355 |
| 2018/0255110 | A1 | 9/2018 | Dowlztkhah et al. |
| 2019/0342365 | A1* | 11/2019 | Vysotsky ................ G06T 7/90 |
| 2019/0356701 | A1* | 11/2019 | Prabhu ................... H04L 65/60 |

OTHER PUBLICATIONS

Vashishth et al., "Addressing Challenges in Browser Based P2P Content Sharing Framework Using WebRTC," IEEE 30th International Conference on Advanced Information Networking and Applications, 2016, pp. 850-857.

Feher et al., "The Security of WebRTC," copyright arXiv, a registered trademark of Cornell University, Jan. 2016, 10 pages. https://arxiv.org/ftp/arxiv/papers/1601/1601.00184.pdf.

"Lifetime of a WebRTC session," Web technology for developers, MDN Web Docs, accessed Jun. 12, 2019, 5 pages. https://developer.mozilla.org/en-US/docs/web/api/webrtc_api/session_lifetime#signaling.

List of IBM Patents or Patent Applications Treated as Related, dated Jul. 10, 2019, 2 pages.

Office Action, dated Apr. 24, 2020, regarding U.S. Appl. No. 16/438,616, 15 pages.

Notice of Allowance, dated Jun. 10, 2020, regarding U.S. Appl. No. 16/438,616, 5 pages.

* cited by examiner

DIRECT COMMUNICATION BETWEEN A SECURE APPLICATION AND A LOCAL APPLICATION RUNNING ON THE SAME DEVICE

BACKGROUND

1. Field

The disclosure relates generally to direct intradevice communication between applications and more specifically to establishing a direct Web Real-Time Communication data channel between a secure web application running in a web browser and a local native application running outside the web browser in the same device.

2. Description of the Related Art

Sometimes a need exists for a secure web application to communicate directly with a locally installed and user-approved local native application on the same device to provide functionalities that are not available in current Hypertext Markup Language (HTML) 5 and browser extensions. HTML 5 is a software solution stack that defines properties and behaviors of web page content by implementing a markup-based pattern to it. HTML 5 includes detailed processing models to encourage more interoperable implementations. HTML 5 extends, improves, and rationalizes the markup available for documents and introduces markup and application programming interfaces (APIs) for complex web applications. A browser extension is a small software module, which typically is just source code, for customizing a web browser. Web browsers typically allow a variety of extensions, including user interface modifications, ad blocking, and cookie management.

Before the widespread adoption of Hypertext Transfer Protocol Secure (HTTPS), communication between secured web applications and locally installed applications was easier to perform because web browsers allowed native application plugins and the mixing of Hypertext Transfer Protocol (HTTP) and HTTPS content. HTTPS is an extension of HTTP. HTTP is an application protocol for distributed, collaborative, hypermedia information systems. HTTP is the foundation of data communication for the World Wide Web. HTTPS is used for secure communication over a computer network and is widely used on the Internet. In HTTPS, the communication protocol is encrypted using Transport Layer Security (TLS) or Secure Sockets Layer (SSL).

SUMMARY

According to one illustrative embodiment, a method for establishing communication between a secure web application and a local native application is provided. A data processing system receives a first input to establish a direct Web Real-Time Communication data channel between the secure web application running in a web browser and the local native application running outside the web browser in the data processing system. In response to the data processing system receiving the first input, the data processing system establishes the direct Web Real-Time Communication data channel between the secure web application running in the web browser and the local native application running outside the web browser in the data processing system.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
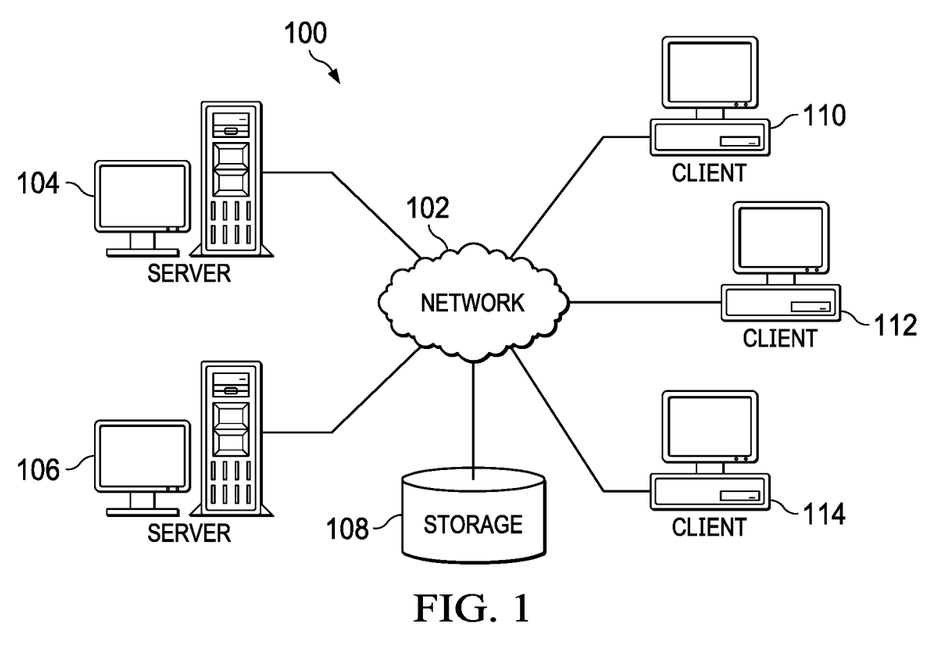
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 may be a signaling or rendezvous server for exchanging OFFER and ANSWER messages for initiating establishment of a direct Web Real-Time Communication data channel between a secure web application running in a web browser and a local native application running outside the web browser in the same client device. Further, server 106 may provide one or more secure services, such as, for example, banking services, financial services, educational services, governmental services, data services, healthcare services, and the like, to registered client device users. Also, it should be noted that server 104 and server 106 may each represent clusters of servers in one or more data centers. Alternatively, server 104 and server 106 may each represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, kiosks, and the like. Users of clients 110, 112, and 114 may utilize clients 110, 112, and 114 to access and utilize the services provided by server 104 and server 106. Server 104 and server 106 may also provide information, such as, for example, software programs and applications, software updates, software fixes, and the like to clients 110, 112, and 114.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of client devices, identifiers for a plurality of client device users, and the like. Furthermore, storage 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
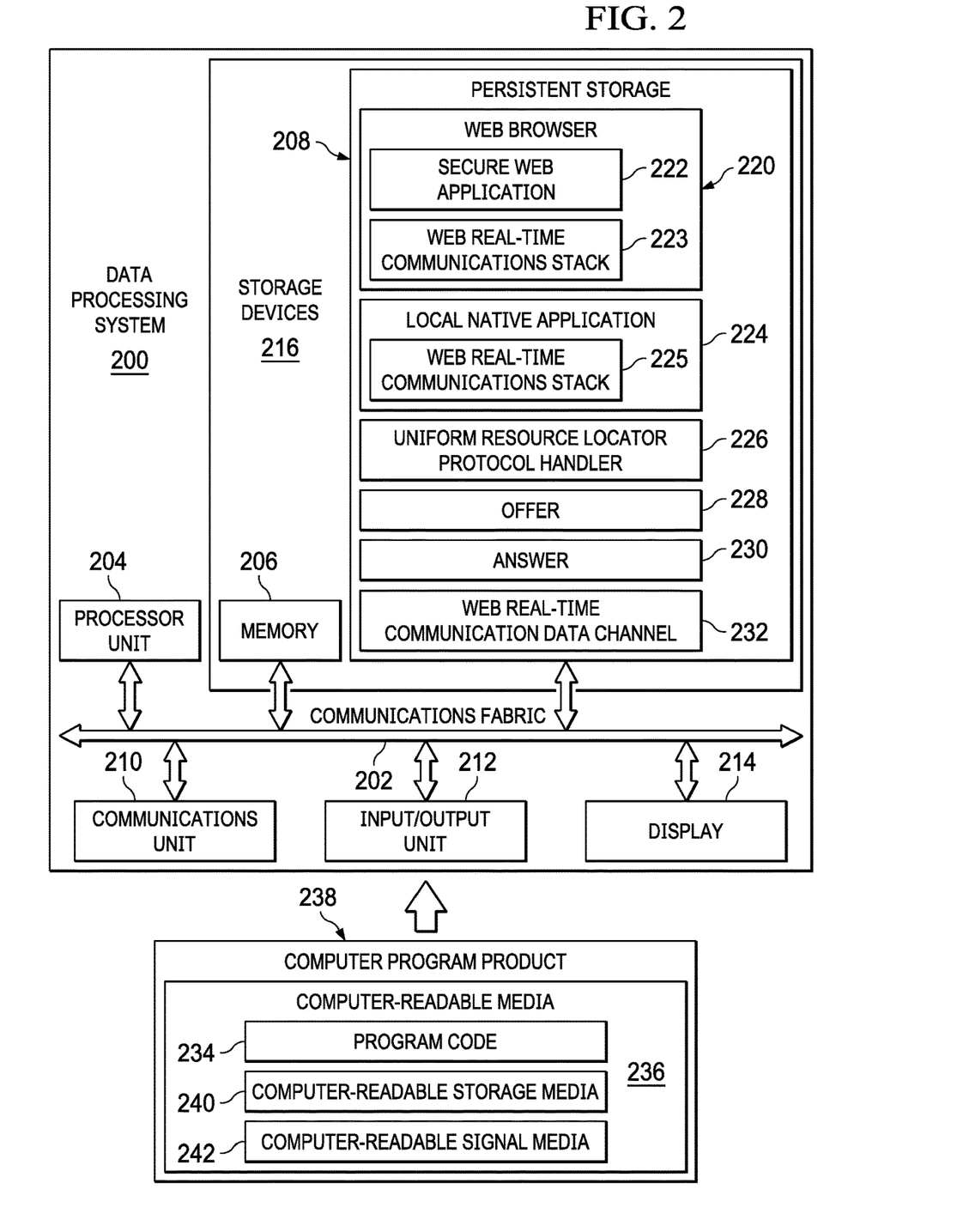
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a hardware data processing device, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, or some combination of the above. The media used by persistent storage 208 may be removable. For example, a removable hard disk drive may be used for persistent storage 208.

In this example, persistent storage 208 stores web browser 220 and local native application 224. Web browser 220 is a software application loaded on data processing system 200 for accessing information, such as web pages, on the World Wide Web, which is an Internet-based system of interlinked content. Each individual web page, image, video, and the like is identified by a distinct uniform resource locator (URL), enabling web browser 220 to retrieve these resources from a remote web server, such as server 106 in FIG. 1, and display these resources on display 214. Secure web application 222 may be, for example, a secure banking application running on web browser 220. A user of data processing system 200 may utilize secure web application 222 to access bank records or perform a banking transaction, for example, with a secure remote bank server via web browser 220.

Local native application 224 is associated with secure web application 222 and is running outside of web browser 220 on data processing system 200. For example, local native application 224 may be, for example, a spreadsheet application for tracking bank balances, bank transactions, net worth, and the like. Local native application 224 registers uniform resource locator protocol handler 226 with the operating system of data processing system 200. Alternatively, local native application 224 registers uniform resource locator protocol handler 226 with web browser 220. Secure web application 222 utilizes uniform resource locator protocol handler 226 to launch local native application 224 after establishing an online session with the secure remote server corresponding to secure web application 222. Further, secure web application 222 utilizes uniform resource locator protocol handler 226 to send information to local native application 224.

In addition, secure web application 222 generates OFFER 228. OFFER 228 is an offer to establish Web Real-Time Communication data channel 232. OFFER 228 may include, for example, an identifier of secure web application 222, the public cryptographic key associated with the private cryptographic key of secure web application 222, and all other information, such as IP address, port numbers, and the like, needed to establish Web Real-Time Communication data channel 232 between secure web application 222 and local native application 224. Secure web application 222 then triggers uniform resource locator protocol handler 226 to send OFFER 228 to local native application 224 via a one-shot, one-way message. ANSWER 230 contains all the information, such as, for example, the public cryptographic key associated with the private cryptographic key of secure web application 222, IP address, port numbers, and the like, needed to establish Web Real-Time Communication data channel 232 between secure web application 222 and local native application 224. In a typical use of Web Real-Time Communications between distinct and separate data processing systems, an ANSWER to an OFFER must be explicitly communicated from one data processing system to another, because the program which generated the OFFER has no way of determining the information that might be in the other program's ANSWER. However, in the scenario of illustrative embodiments described herein, with both programs running on the same data processing system and designed by authors in collaboration with one another, it is possible to design secure web application 222 and local native application 224 such that they both contain the information of the ANSWER in their program code and/or data. If this is done, ANSWER 230 may be, for example, a preestablished answer embedded in both secure web application 222 and local native application 224. Alternatively, secure web application 222 may precompute/generate ANSWER 230 on the fly and send ANSWER 230 and the associated private cryptographic key to local native application 224 at the same time as OFFER 228 via uniform resource locator protocol handler 226. Another alternative is to send OFFER 228 and ANSWER 230 via a signaling or rendezvous server, such as, for example, server 104 in FIG. 1.

Illustrative embodiments accomplish Web Real-Time Communications between two software programs, each of which contains, among other things, code that performs the functions of Web Real-Time Communications. This code is referred to as a Web Real-Time Communications stack. In this example, web browser 220 contains Web Real-Time Communications stack 223. Further, local native application 224 also contains its own instance of a Web Real-Time Communications stack, Web Real-Time Communications stack 225. Web Real-Time Communications stacks 223 and 225 both perform similar functions of communications via the Web Real-Time Communications protocol, but that does not imply how similar or dissimilar the code instructions comprising Web Real-Time Communications stacks 223 and 225 may be. Once OFFER 228 and ANSWER 230 are exchanged between secure web application 222 and local native application 224, secure web application 222 uses the information contained in OFFER 228 and ANSWER 230 to initialize Web Real-Time Communications stack 223 contained in web browser 220, and local native application 224 uses the information contained in OFFER 228 and ANSWER 230 to initialize Web Real-Time Communications stack 225 contained in local native application 224. After both Web Real-Time Communications stacks 223 and 225 are initialized, Web Real-Time Communications stacks 223 and 225 establish secure communications between each other via Web Real-Time Communications data channel 232, thus allowing data to be securely communicated between secure web application 222 and local native application 224. Web Real-Time Communication data channel 232 represents a secure bidirectional data channel between secure web application 222 and local native application 224 within data processing system 200 based on Web Real-Time Communications.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a data processing system may be downloaded over a network from the data processing system to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, direct communication between secured web applications and locally installed applications on the same device is difficult for several reasons. One reason is that the Internet is quickly migrating from HTTP to HTTPS, which is fast becoming the default for all secure web applications. A second reason is that web browsers are increasingly secured and sandboxed. A third reason is that web browsers are forbidding native application plugins. A fourth reason is that web browsers now strictly disallow mixed content, such as, for example, loading HTTP/Web Socket content into an HTTPS web application.

Several solutions have tried to address direct communication between secure web applications and locally installed applications, but each of these solutions has issues. For example, one current solution utilizes a "localhost" digital certificate. This solution consists of embedding the digital certificate and its corresponding private key inside the installed native application and making the digital certificate's domain name resolve to the "localhost" address of 127.0.0.1. 127.0.0.1 is the loopback Internet protocol (IP) address referred to as the "localhost." The address is used to establish an IP connection to the same device or machine being used by the end-user. This has the effect of making the locally installed native application appear as a secure web server from the web browser's perspective. However, since the native application's Domain Name System (DNS) entry resolves to the "localhost" address of 127.0.0.1, the web browser looks at the local device, instead of some remote server, and finds the local instance of the running native application.

This solution has a major and potentially devastating issue though. The issue is that at any time public DNS services may disallow resolving a public domain name to the reserved special "localhost" IP address 127.0.0.1. This would render as unusable any product, service, or application relying upon the first current solution above.

A second current solution utilizes web browser extensions. Even though current web browser extensions are secured and sandboxed, techniques exist to explicitly allow web browser extensions to communicate with specific applications. However, one issue with this second current solution is that, on top of having to install the native application, the user will also have to install the corresponding web browser extension in every web browser the user utilizes.

A third current solution adds a self-signed digital certificate, which corresponds to a native application, to the web browser's or operating system's trusted list. Issues associated with this third current solution are, for example, that it is impractical, tedious, and not scalable and it has to be performed on each web browser requiring user interaction.

Illustrative embodiments utilize Web Real-Time Communication in a novel way to establish a data communication channel between a secure web application loaded and running in a web browser and a native local application located and running outside of the web browser in the same device or machine, such as, for example, a computer. Thus, illustrative embodiments are capable of creating a fast and bidirectional data communication channel that respects the web browser's no mixed content policy, while not suffering from any of the issues corresponding to the current solutions noted above.

Web Real-Time Communication is a free, open-source project that provides web browsers and mobile applications with real-time communication via simple APIs. Web Real-Time Communication enables audio, video, and data communication to work inside web pages by allowing direct peer-to-peer communication, eliminating the need to install plugins or download native applications. In addition, Web Real-Time Communication addresses the challenge of peer-to-peer communication from both a security standpoint (e.g., how trust is established between peers) and a connectivity standpoint (e.g., how Network Address Translation (NAT) device traversal is performed).

Typically, Web Real-Time Communication is used to establish a direct audio, video, and data communication channel between two remote web browsers located in two different devices controlled by two different users. Each device is usually located behind a corresponding NAT router. Primarily, Web Real-Time Communication is used for web videoconferencing, web chats, and online gaming.

Illustrative embodiments utilize Web Real-Time Communication in a different and novel way. For example, instead of connecting two remote web browsers, illustrative embodiments utilize Web Real-Time Communication to connect a secure web application with a local native application in the same device. In other words, instead of connecting two distinct devices over a WAN and having to cross NAT routers, illustrative embodiments connect two applications both running on the same device controlled by the same user. In addition, illustrative embodiments do not utilize the audio and video capabilities of Web Real-Time Communication. Instead, illustrative embodiments only utilize the data channel capability of Web Real-Time Communication.

Unlike HTTP, Web Real-Time Communication is secure by default and by design. In other words, Web Real-Time Communication does not have insecure options. Web browsers treat Web Real-Time Communication at the same level of security as HTTPS. As a result, no mixed content issues exist between Web Real-Time Communication and HTTPS. However, even though Web Real-Time Communication, like HTTPS, uses Public Key Infrastructure (PKI) and X.509 certificates for authentication and security, their trust models are fundamentally different. PKI is a set of roles, policies, and procedures needed to create, manage, distribute, use, store, and revoke digital certificates and manage cryptographic key encryption. The purpose of a PKI is to facilitate secure electronic transfer of data for a range of network activities, such as, for example, e-commerce, internet banking, and confidential email. X.509 is a standard defining the format of digital certificates.

HTTPS is a client/server technology. HTTPS trust is derived from the fact that a client (i.e., the web browser) inherently trusts a set of well-known CAs that are included in a list. Typically, web browser vendors embed this list of well-known CAs in their web browsers and, therefore, this list cannot be easily modified by a web application or a user. This forces any online entity, such as, for example, a company or organization, to obtain a server certificate that is signed by one of these CAs in the list. These CAs vouch for the server certificate's validity and have the responsibility to revoke it if trust has been lost.

Conversely, Web Real-Time Communication is a peer-to-peer technology meant to be used between two different devices. Consequently, Web Real-Time Communication's trust model cannot rely upon the HTTPS model of requiring one or both parties to obtain a signed digital certificate by a mutually trusted CA. This would be time-consuming, costly, and impractical. Because of that, Web Real-Time Communication technology designers chose not to establish trust within the technology, but instead delegated trust establishment to the parties involved via an out-off-band mechanism.

In Web Real-Time Communication, signaling is the process of sending control information between two devices to determine the communication protocols, channels, media codecs, and formats and method of data transfer, as well as any required routing information. In other words, the signaling process for Web Real-Time Communication is not defined in the specification of Web Real-Time Communication. Thus, in order to establish a Web Real-Time Communication session, the two devices must first establish a way to exchange two messages, an OFFER to establish a communication channel and an ANSWER containing all the information that Web Real-Time Communication needs to establish the communication channel, including respective devices' public keys, ports, and the like. This message exchange may occur in several different ways. For example, the two devices may already be in communication via a social media web site, chat room, instant messaging, email, or some similar means, so that the two devices can exchange the OFFER and ANSWER messages by whatever communication method already established. In other words, Web Real-Time Communication does not enforce how these two messages are exchanged. The exchange can happen electronically using a signaling or rendezvous server, which is the most common method, but also may happen via other means, such as, for example, user copy-and-paste or the like. This means that as long as illustrative embodiments are able to exchange the OFFER and ANSWER messages between the secure web application running in the web browser and the local native application running outside the web browser on the same device, illustrative embodiments can establish a Web Real-Time Communication data channel between the secure web application and the local native application.

Once established, the secure web browser treats this secure, fast, bidirectional Web Real-Time Communication data channel as equivalent to HTTPS security. As a result, the Web Real-Time Communication data channel does not trigger any mixed content policy errors. Even though Web Real-Time Communication, like HTTPS, relies upon X.509 certificates and PKI security, Web Real-Time Communication does not rely upon one or both of these certificates being signed by a trusted CA. Consequently, these certificates cannot be revoked by any CA for any reason.

Illustrative embodiments may utilize one of two methods to exchange the OFFER and ANSWER messages to establish the direct Web Real-Time Communication data channel between the secure web application running in the web browser and the local native application running outside the web browser in the same device. The first method utilizes a signaling or rendezvous server. This first method is a more traditional Web Real-Time Communication method that has both the secure web application and the local native application rely upon the signaling or rendezvous server to exchange the OFFER and ANSWER messages. This server can be the same as the webserver that served the secure web application or any other dedicated server. The secure web application via, for example, a uniform resource locator protocol handler, can pass the server name and a unique session identifying token to the local native application. Then, both the secure web application and the local native application can connect to the server using the unique session identifying token and exchange the OFFER and ANSWER message.

The second method is a more novel approach that does not rely on any signaling or rendezvous server. In other words, the second method of illustrative embodiments utilizes Web Real-Time Communication fully within one local device without a network to transmit data between the secure web application and the local native application. Thus, using this second method, illustrative embodiments are inherently immune from any attacks that rely on intercepting data traveling between devices via a network. In this second method, the local native application registers a uniform resource locator protocol handler with the operating system. This enables a secure web browser application to both launch the associated local native application and pass information to the local native application via that uniform resource locator protocol handler. However, using this second method, the secure web application does not know whether the local native application is actually registered for a given uniform resource locator protocol handler or whether the local native application successfully received the OFFER message.

Thus, because illustrative embodiments do not have control of the web browser's implementation, and especially, which ports, digital certificates, and credentials the web browser will utilize to establish the Web Real-Time Communication data channel, illustrative embodiments utilize the web browser to dynamically generate the OFFER and have both applications use that specific OFFER. Illustrative embodiments leverage the uniform resource locator protocol handler to pass the OFFER between the secure web application and the local native application.

Unlike the web browser, illustrative embodiments have control of the local native application's implementation. In other words, illustrative embodiments are able to dictate which ports, digital certificates, and credentials that the local native application will utilize to establish the Web Real-Time Communication data channel. Most, if not all, aspects of the ANSWER can be predefined and known by both the local native application and the secure web application. As a result, illustrative embodiments eliminate the need to exchange the ANSWER from the local native application to the secure web application. In other words, both applications already have the ANSWER.

Thus, illustrative embodiments do not utilize Web Real-Time Communication in the typical manor where both endpoints (usually web browsers) are using the signaling phase to discover and negotiate all aspects of the connection from trust to codecs, to IP addresses and ports. Instead, illustrative embodiments know almost everything beforehand and this information can be embedded in both the secure web application and the local native application when they are released. Illustrative embodiments do not control the web browser (e.g., how the web browser generates session keys and which ports the web browser uses) and that is why the OFFER is dynamically generated by the web browser. However, illustrative embodiments do control the local native application logic and so illustrative embodiments can easily dictate which port the local native application should open and which key pair the local native application should use to establish the secure Web Real-Time Communication data channel.

Thus, illustrative embodiments provide one or more technical solutions that overcome a technical problem with establishing a direct data channel between a secure web application running in a web browser and a local native application running outside the web browser in the same device. As a result, these one or more technical solutions provide a technical effect and practical application in the field of direct communication between secure and non-secure applications within one device.

Figure 3:
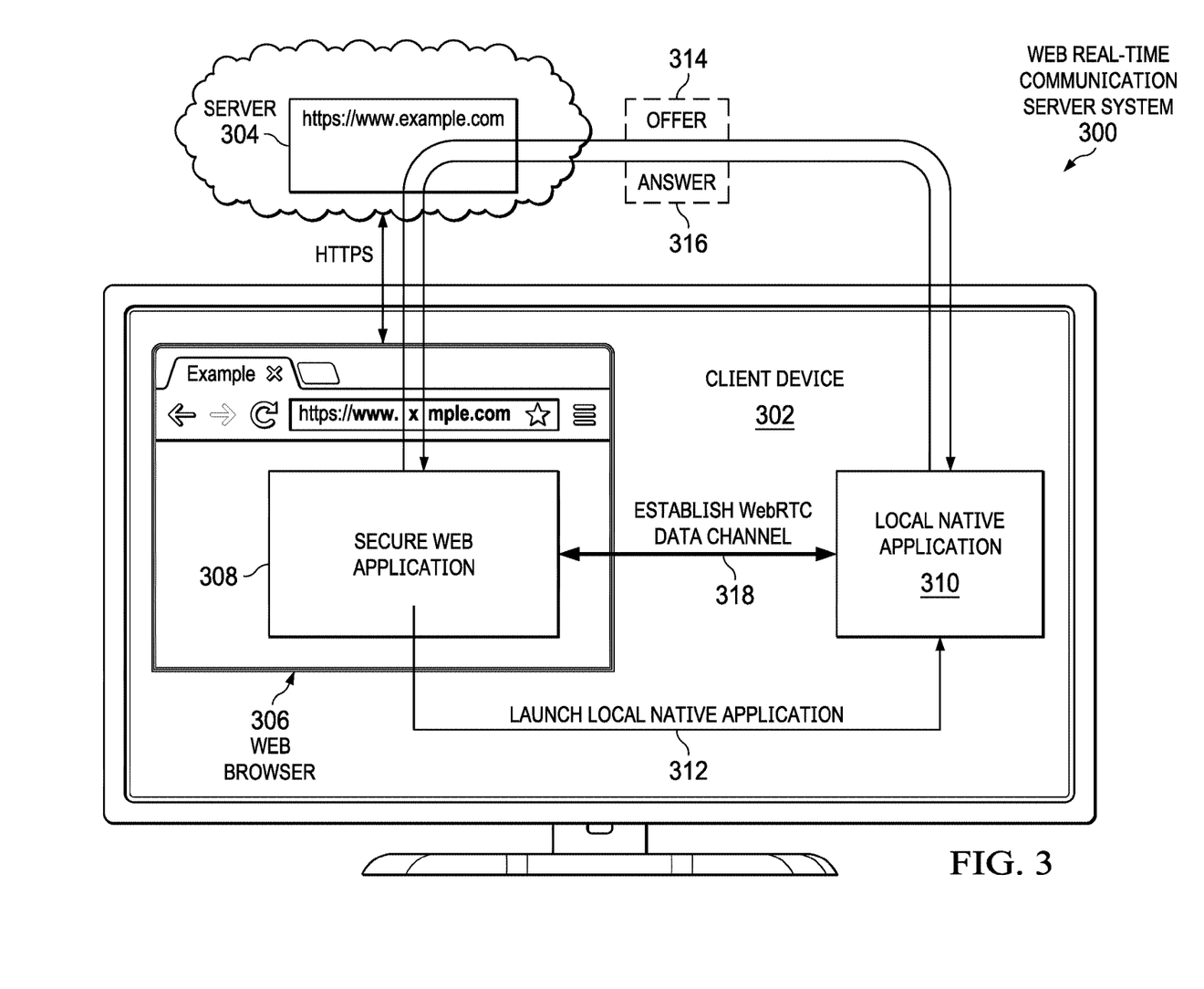
FIG. 3 is a diagram illustrating an example of a Web Real-Time Communication server system in accordance with an illustrative embodiment.

With reference now to FIG. 3, a diagram illustrating an example of a Web Real-Time Communication server system is depicted in accordance with an illustrative embodiment. Web Real-Time Communication server system 300 may be implemented in a network of data processing systems, such as network data processing system 100 in FIG. 1. Web Real-Time Communication server system 300 is a system of hardware and software components for establishing a direct Web Real-Time Communication data channel between a secure web application running in a web browser and a local native application running outside the web browser in the same device.

In this example, Web Real-Time Communication server system 300 includes client device 302 and server 304. However, it should be noted that Web Real-Time Communication server system 300 is only intended as an example and not as a limitation on illustrative embodiments. In other words, Web Real-Time Communication server system 300 may include any number of client devices and server computers.

Client device 302 may be, for example, client 110 in FIG. 1 and may represent any type of client device, such as a personal computer, laptop computer, handheld computer, smart phone, or the like. Server 304 may be, for example, server 104 in FIG. 1 and is a signaling or rendezvous server for exchanging OFFER and ANSWER messages between secure web application 308 and local native application 310. Secure web application 308 and local native application 310 may be, for example, secure web application 222 and local native application 224 in FIG. 2. Secure web application 308 runs in web browser 306, such as, for example, web browser 220 in FIG. 2. Local native application 310 corresponds to secure web application 308 and runs outside of web browser 306 in client device 302.

Secure web application 308 communicates with server 304 and other remote servers, such as server 106 in FIG. 1, via HTTPS. In addition, at 312, secure web application 308 launches local native application 310 using, for example, a uniform resource locator protocol handler, such as uniform resource locator protocol handler 226 in FIG. 2, after secure web application 308 establishes a connection with a remote server, such as a bank server, corresponding to secure web application 308. Further, secure web application 308 generates and sends OFFER 314, such as, for example, OFFER 228 in FIG. 2, to local native application 310 via server 304. In response to receiving OFFER 314, local native application 310 generates and sends ANSWER 316, such as, for example, ANSWER 230 in FIG. 2, to secure web application 308 via server 304. Then, at 318, secure web application 308 and local native application 310 establish a direct Web Real-Time Communication data channel, such as, for example, Web Real-Time Communication data channel 232 in FIG. 2, between secure web application 308 and local native application 310 within client device 302.

Figure 4:
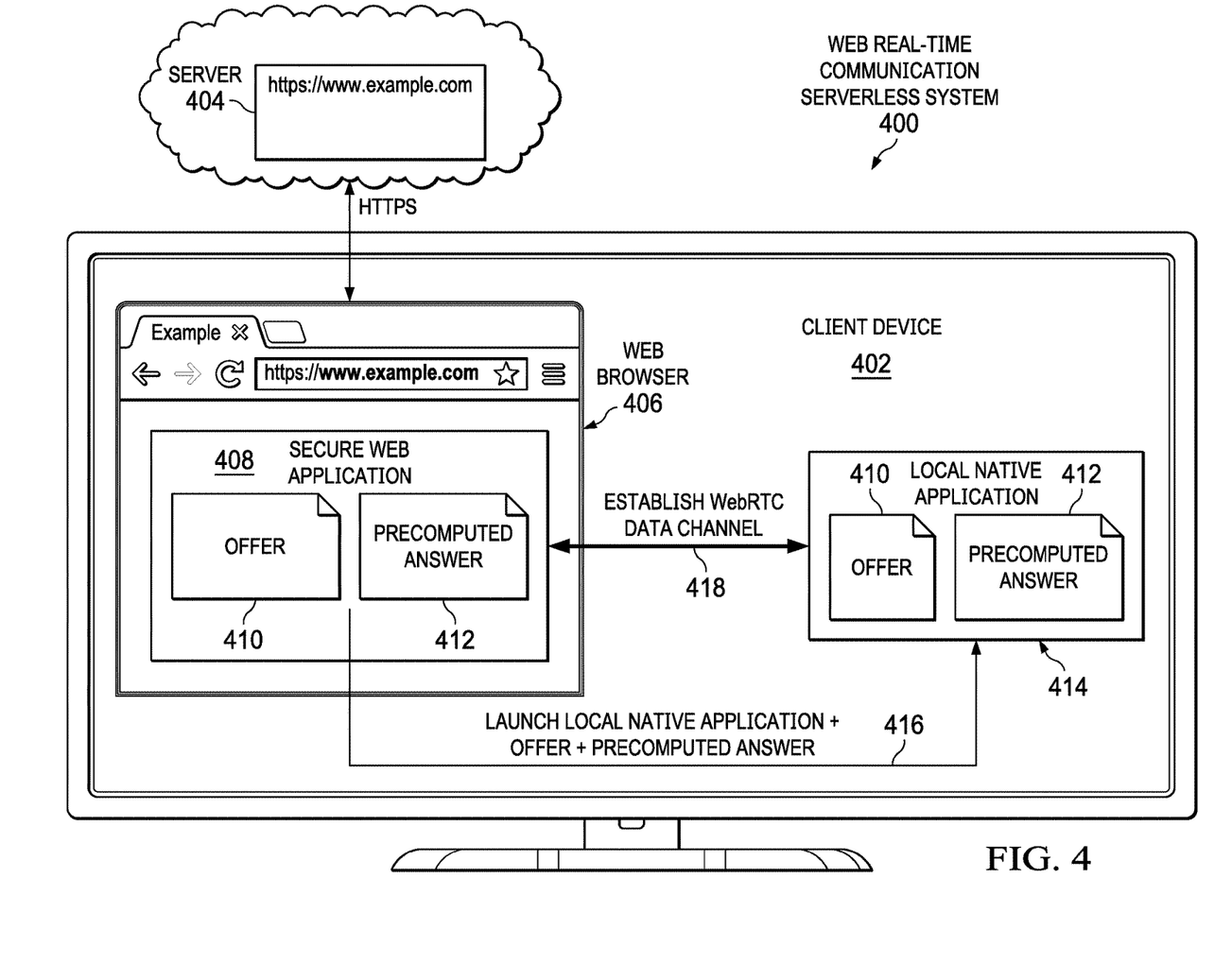
FIG. 4 is a diagram illustrating an example of a Web Real-Time Communication serverless system in accordance with an illustrative embodiment.

With reference now to FIG. 4, a diagram illustrating an example of a Web Real-Time Communication serverless system is depicted in accordance with an illustrative embodiment. Web Real-Time Communication serverless system 400 is implemented in a client device, such client device 402. Client device 402 may be, for example, client 110 in FIG. 1 or data processing system 200 in FIG. 2.

In this example, Web Real-Time Communication serverless system 400 includes client device 402 and server 404. However, it should be noted that in this example server 404 is a remote server, such as a bank server (e.g., server 106 in FIG. 1), that corresponds to secure web application 408. In other words, server 404 is not a signaling or rendezvous server in this example.

Secure web application 408 runs in web browser 406 and communicates with server 404 via HTTPS. In addition, secure web application 408 generates OFFER 410 and retrieves precomputed ANSWER 412 for establishing a direct Web Real-Time Communication data channel with local native application 414, which corresponds to secure web application 408 and runs outside of web browser 406 in client device 402. At 416, secure web application 408 launches local native application 414 and sends OFFER 410 and precomputed ANSWER 412 to local native application 414 via local communication using, for example, a uniform resource locator protocol handler registered with the operating system of client device 402 by local native application 414. At 418, secure web application 408 and local native application 414 establish the direct Web Real-Time Communication data channel between secure web application 408 and local native application 414 based on the information in OFFER 410 and precomputed ANSWER 412.

Figure 5:
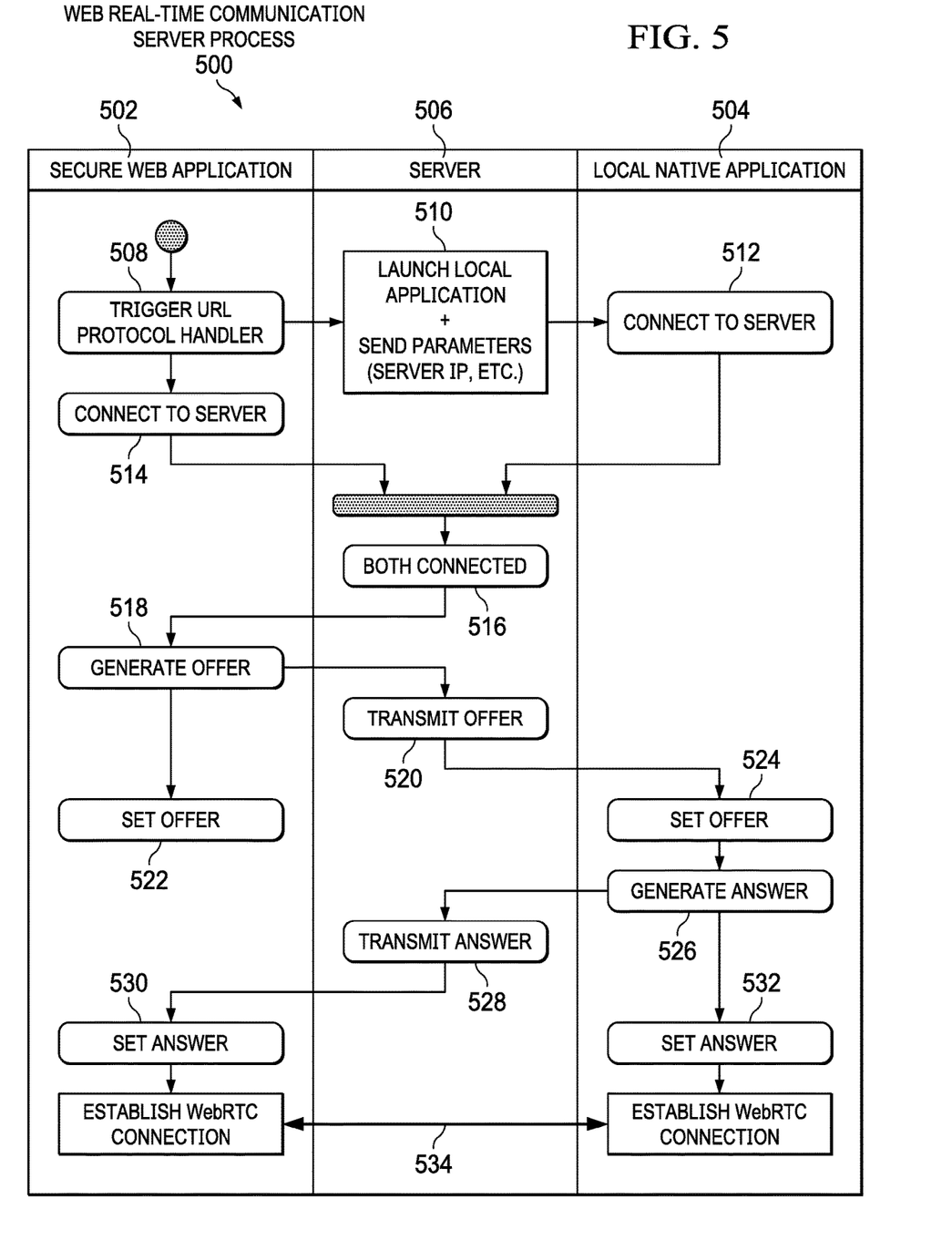
FIG. 5 is a diagram illustrating an example of a Web Real-Time Communication server process in accordance with an illustrative embodiment.

With reference now to FIG. 5, a diagram illustrating an example of a Web Real-Time Communication server process is depicted in accordance with an illustrative embodiment. Web Real-Time Communication server process 500 may be implemented in a network of data processing systems, such as network data processing system 100 in FIG. 1. In this example, Web Real-Time Communication server process 500 includes secure web application 502, local native application 504, and server 506, such as, for example, secure web application 308, local native application 310, and server 304 in FIG. 3.

At 508, secure web application 502 triggers a uniform resource locator protocol handler, which is registered by and associated with local native application 504, after secure web application 502 connects with a remote server, such as server 106 in FIG. 1, which corresponds to secure web application 502. At 510, secure web application 502, using the uniform resource locator protocol handler, launches local native application 504 and sends parameters, such as, for example, Internet Protocol (IP) address of server 506 and the like, to local native application 504. At 512, local native application 504 connects to server 506. Similarly, at 514, secure web application 502 connects to server 506. It should be noted that server 506 is a signaling or rendezvous server, such as server 104 in FIG. 1, in this example.

At 516, both secure web application 502 and local native application 504 are connected to server 506. At 518, secure web application 502 generates an OFFER to establish a direct Web Real-Time Communication data channel with secure web application 502. At 520, secure web application 502 transmits the OFFER to local native application 504 via server 506.

At 522, secure web application 502 sets the OFFER in secure web application 502. Similarly, at 524, local native application 504 sets the OFFER in local native application 504. At 526, in response to receiving the OFFER, local native application 504 generates an ANSWER to the OFFER. At 528, local native application 504 transmits the ANSWER to secure web application 502 via server 506.

At 530, secure web application 502 sets the ANSWER in secure web application 502. Similarly, at 532, local native application 504 sets the ANSWER in local native application 504. At 534, secure web application 502 and local native application 504 establish the direct Web Real-Time Communication data channel between secure web application 502 and local native application 504 based on the information in the OFFER and the ANSWER set in secure web application 502 and local native application 504.

Figure 6:
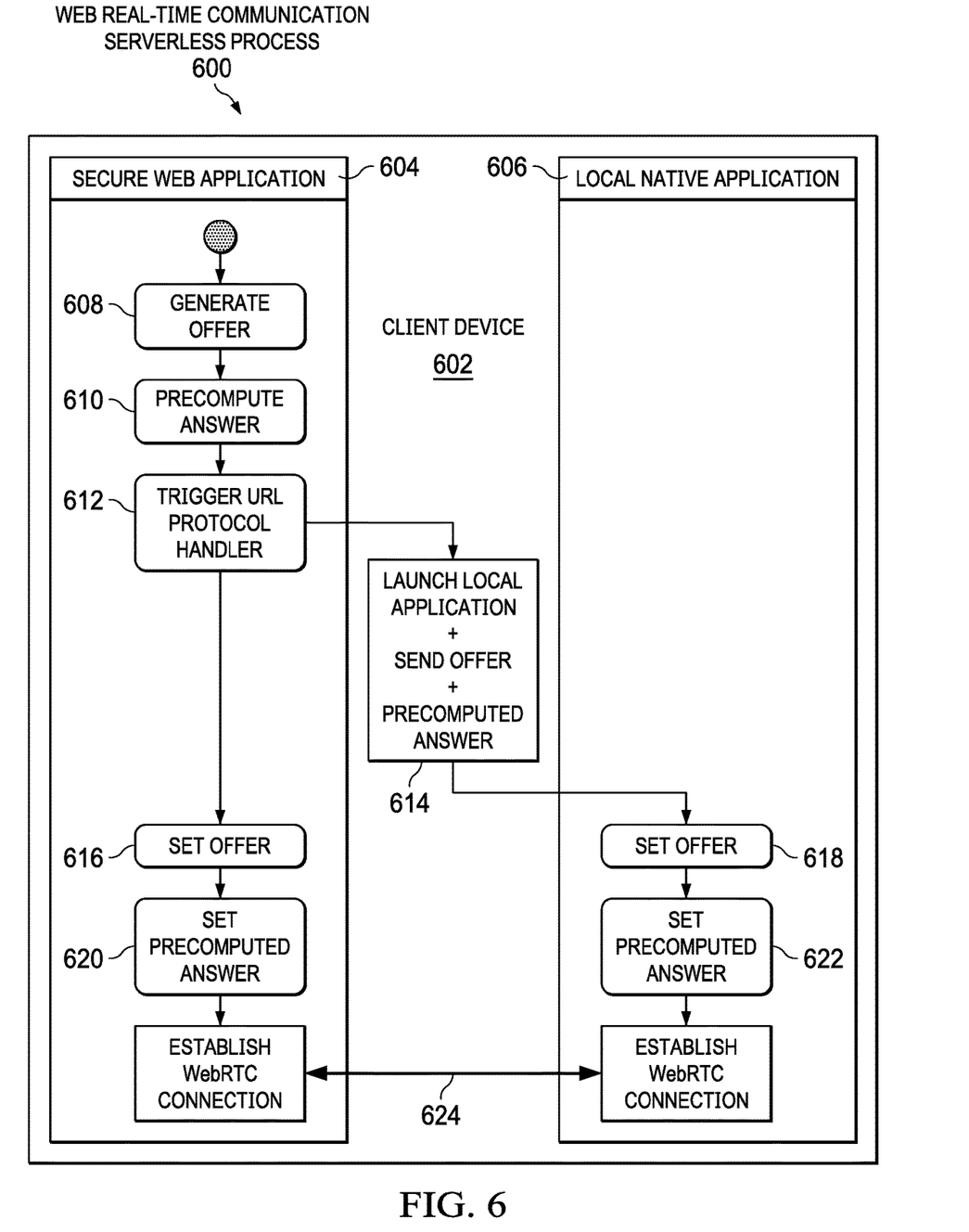
FIG. 6 is a diagram illustrating an example of a Web Real-Time Communication serverless process in accordance with an illustrative embodiment.

With reference now to FIG. 6, a diagram illustrating an example of a Web Real-Time Communication serverless process is depicted in accordance with an illustrative embodiment. Web Real-Time Communication serverless process 600 is implemented in client device 602, such as, for example, client device 402 in FIG. 4. In this example, client device 602 includes secure web application 604 and local native application 606. It should be noted that secure web application 604 runs in a web browser, such as, for example, web browser 406 in FIG. 4, and local native application 606 corresponds to secure web application 604 and runs outside of the web browser in client device 602. Also, client device 602 may include any number of secure web applications and corresponding local native applications.

At 608, secure web application 604 generates an OFFER to establish a direct Web Real-Time Communication data channel with secure web application 604. In addition, at 610, secure web application 604 precomputes an ANSWER to the OFFER. Further, at 612, secure web application 604 triggers a uniform resource locator protocol handler associated with local native application 606.

At 614, secure web application 604 launches local native application 606 and the sends the OFFER and precomputed ANSWER to local native application 606 using the uniform resource locator protocol handler. At 616, secure web application 604 sets the OFFER in secure web application 604. Similarly, at 618, local native application 606 sets the OFFER in local native application 606. Also, at 620, secure web application 604 sets the precomputed ANSWER in secure web application 604. Similarly, at 622, local native application 606 sets the precomputed ANSWER in local native application 606. Then, at 624, secure web application 604 and local native application 606 establish the direct Web Real-Time Communication data channel between secure web application 604 and local native application 606 in client device 602 based on information in the OFFER and precomputed ANSWER.

Figure 7:
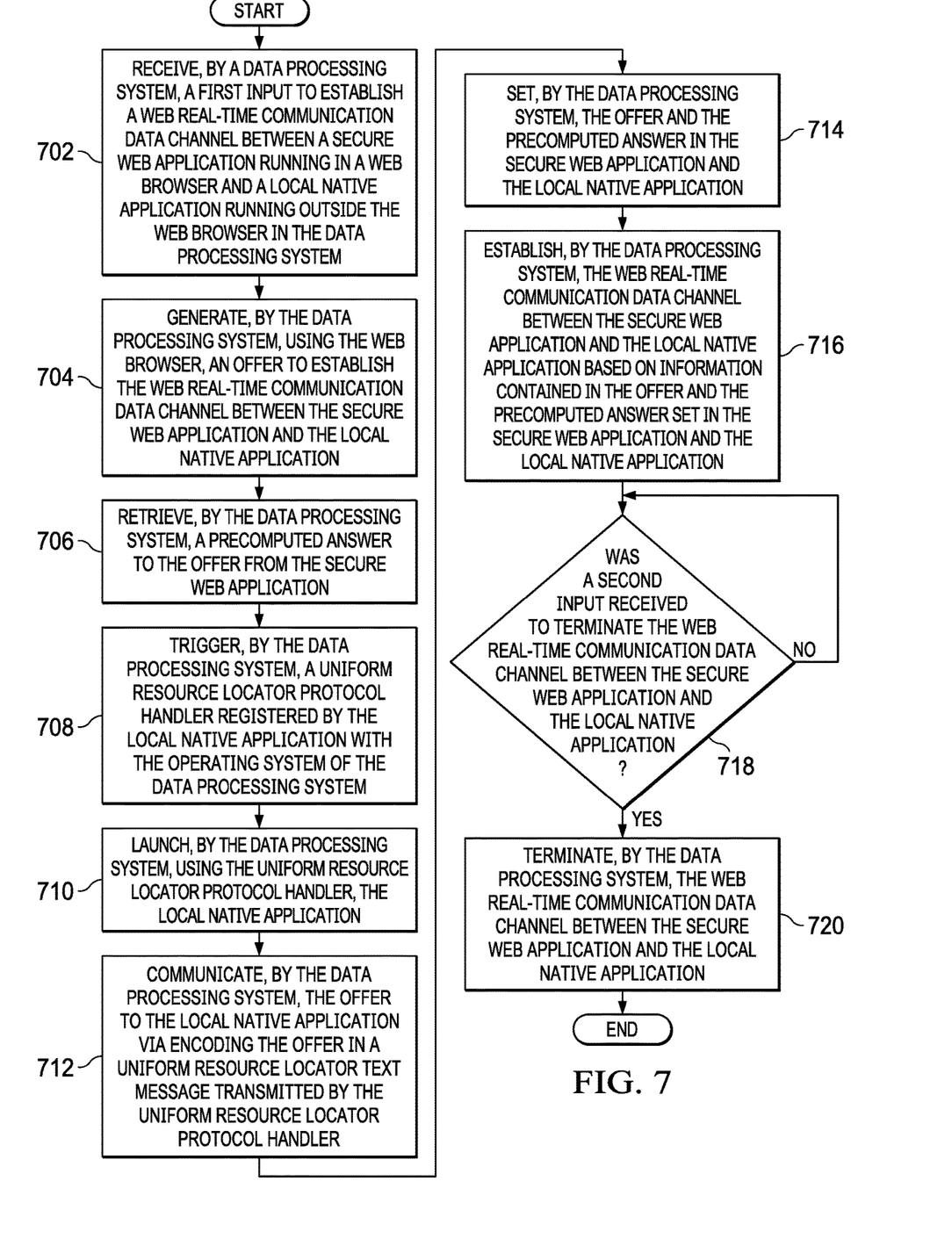
FIG. 7 is a flowchart illustrating a process for establishing a Web Real-Time Communication data channel between a secure web application and a local native application in accordance with an illustrative embodiment.

With reference now to FIG. 7, a flowchart illustrating a process for establishing a Web Real-Time Communication data channel between a secure web application and a local native application is shown in accordance with an illustrative embodiment. The process shown in FIG. 7 may be implemented in a data processing system, such as, for example, client 110 in FIG. 1 or data processing system 200 in FIG. 2.

The process begins when the data processing system receives a first input to establish the Web Real-Time Communication data channel between the secure web application running in a web browser and the local native application running outside the web browser in the data processing system (step 702). Afterward, the data processing system, using the web browser, generates an OFFER to establish the Web Real-Time Communication data channel between the secure web application and the local native application (step 704). In addition, the data processing system retrieves a precomputed ANSWER to the OFFER from the secure web application (step 706). Further, the data processing system triggers a uniform resource locator protocol handler registered by the local native application with the operating system of the data processing system (step 708).

Then, the data processing system, using the uniform resource locator protocol handler, launches the local native application (step 710). Furthermore, the data processing system, using the uniform resource locator protocol handler, sends the OFFER and precomputed ANSWER to the local native application via local interprocess communication (step 712). The data processing system also sets the OFFER and the precomputed ANSWER in the secure web application and the local native application (step 714).

Moreover, the data processing system establishes the Web Real-Time Communication data channel between the secure web application running in the web browser and the local native application running outside the web browser on the data processing system based on information contained in the OFFER and the precomputed ANSWER set in the secure web application and the local native application (step 716). Subsequently, the data processing system makes a determination as to whether a second input was received to terminate the Web Real-Time Communication data channel between the secure web application and the local native application (step 718). If the data processing system determines that a second input was not received to terminate the Web Real-Time Communication data channel between the secure web application and the local native application, no output of step 718, then the process returns to step 718 where the data processing system continues to maintain the Web Real-Time Communication data channel between the secure web application and the local native application until the data processing system receives the second input to terminate the Web Real-Time Communication data channel. If the data processing system determines that the second input was received to terminate the Web Real-Time Communication data channel between the secure web application and the local native application, yes output of step 718, then the data processing system terminates the Web Real-Time Communication data channel between the secure web application and the local native application (step 720). Thereafter, the process terminates.

Thus, illustrative embodiments of the present invention provide a computer-implemented method, data processing system, and computer program product for establishing a direct Web Real-Time Communication data channel between a secure web application running in a web browser and a local native application running outside the web browser in the same data processing device or machine. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing communication between a secure web application and a local native application, the method comprising:
    receiving, by a data processing system, a first input to establish a direct Web Real-Time Communication data channel between the secure web application running in a web browser of the data processing system and the local native application running outside the web browser in the data processing system; and
    responsive to the data processing system receiving the first input to establish the direct Web Real-Time Communication data channel, establishing, by the data processing system, the direct Web Real-Time Communication data channel between the secure web application running in the web browser of the data processing system and the local native application running outside the web browser in the data processing system, wherein an ANSWER to an OFFER for establishing the direct Web Real-Time Communication data channel is precomputed and known to the secure web application and the local native application prior to communicating the OFFER, such that the ANSWER does not need to be communicated from the local native application to the secure web application in response to receiving the OFFER from the secure web application.

2. The method of claim 1, wherein establishing the direct Web Real-Time Communication data channel between the secure web application and the local native application comprises communicating the OFFER for establishing the direct Web Real-Time Communication data channel via a uniform resource locator protocol handler using a one-shot, one-way message from the secure web application to the local native application.

3. The method of claim 1 further comprising:
    generating, by the data processing system, using the web browser, the OFFER to establish the direct Web Real-Time Communication data channel between the secure web application and the local native application; and
    retrieving, by the data processing system, a precomputed ANSWER to the OFFER from the secure web application.

4. The method of claim 1 further comprising:
    triggering, by the data processing system, a uniform resource locator protocol handler registered by the local native application with an operating system of the data processing system; and
    launching, by the data processing system, the local native application using the uniform resource locator protocol handler.

5. The method of claim 4 further comprising:
    communicating, by the data processing system, the OFFER to the local native application via encoding the OFFER in a uniform resource locator text message transmitted by the uniform resource locator protocol handler.

6. The method of claim 5 further comprising:
    setting, by the data processing system, the OFFER and a precomputed ANSWER in the secure web application and the local native application; and
    establishing, by the data processing system, the direct Web Real-Time Communication data channel between the secure web application running in the web browser and the local native application running outside the web browser on the data processing system based on information contained in the OFFER and the precomputed ANSWER set in the secure web application and the local native application.

7. The method of claim 1 further comprising:
    determining, by the data processing system, whether a second input was received to terminate the direct Web Real-Time Communication data channel between the secure web application and the local native application; and
    responsive to the data processing system determining that the second input was received to terminate the direct Web Real-Time Communication data channel between the secure web application and the local native application, terminating, by the data processing system, the direct Web Real-Time Communication data channel between the secure web application and the local native application.

* * * * *